(12) United States Patent  
Cavallaro et al.

(10) Patent No.: US 7,341,530 B2
(45) Date of Patent: Mar. 11, 2008

(54) VIRTUAL STRIKE ZONE

(75) Inventors: Richard H. Cavallaro, Mountain View, CA (US); Eric Steinberg, San Rafael, CA (US); Andre Gueziec, Sunnyvale, CA (US); Alon Mozes, Redwood City, CA (US)

(73) Assignee: Sportvision, Inc., New York, NY (US)

( * ) Notice: Subject to any disclaimer, the term of this patent is extended or adjusted under 35 U.S.C. 154(b) by 474 days.

(21) Appl. No.: 10/331,117

(22) Filed: Dec. 27, 2002

(65) Prior Publication Data

US 2003/0171169 A1 Sep. 11, 2003

Related U.S. Application Data

(60) Provisional application No. 60/346,990, filed on Jan. 9, 2002.

(51) Int. Cl.
*A63B 69/00* (2006.01)

(52) U.S. Cl. ........................ 473/455; 473/453

(58) Field of Classification Search ................ 473/451, 473/455, 454, 456 Q, 462, 468, 453, 499, 473/500; 273/108, 118, 148
See application file for complete search history.

(56) References Cited

U.S. PATENT DOCUMENTS

| 2,943,141 | A | * | 6/1960 | Knight ........................ 348/157 |
| 4,084,184 | A |   | 4/1978 | Crain |
| 4,199,141 | A | * | 4/1980 | Garcia ........................ 473/455 |
| 4,545,576 | A | * | 10/1985 | Harris ........................ 473/468 |
| 4,563,005 | A | * | 1/1986 | Hand et al. .................. 473/455 |
| 5,264,933 | A |   | 11/1993 | Rosser et al. |
| 5,353,392 | A |   | 10/1994 | Luquet et al. |
| 5,401,016 | A | * | 3/1995 | Heglund et al. ............. 473/476 |
| 5,435,545 | A | * | 7/1995 | Marotta ...................... 473/417 |
| 5,443,260 | A | * | 8/1995 | Stewart et al. .............. 473/451 |
| 5,491,517 | A |   | 2/1996 | Kreitman et al. |
| 5,509,649 | A | * | 4/1996 | Buhrkuhl .................... 473/455 |
| 5,566,934 | A | * | 10/1996 | Black et al. ................. 473/431 |
| 5,676,607 | A | * | 10/1997 | Stumpf ....................... 473/455 |
| 5,742,521 | A | * | 4/1998 | Ellenby et al. ............. 702/127 |
| 5,769,713 | A | * | 6/1998 | Katayama ...................... 463/3 |
| 5,912,700 | A |   | 6/1999 | Honey et al. |
| 5,917,553 | A | * | 6/1999 | Honey et al. ............... 348/578 |
| 5,984,810 | A | * | 11/1999 | Frye et al. ................... 473/455 |
| 6,031,545 | A | * | 2/2000 | Ellenby et al. ............. 345/632 |
| 6,042,492 | A | * | 3/2000 | Baum ......................... 473/453 |
| 6,159,113 | A | * | 12/2000 | Barber ........................ 473/454 |
| 6,257,983 | B1 | * | 7/2001 | Rimoto ........................ 463/38 |
| 6,266,100 | B1 | * | 7/2001 | Gloudemans et al. ....... 348/587 |
| 6,358,164 | B1 | * | 3/2002 | Bracewell et al. .......... 473/454 |
| 2001/0034278 | A1 | * | 10/2001 | Villacorta .................... 473/472 |

* cited by examiner

*Primary Examiner*—Robert E Pezzuto
(74) *Attorney, Agent, or Firm*—Vierra Magen Marcus & DeNiro LLP

(57) ABSTRACT

A system adds a graphical image of the strike zone to a video or other image of a baseball game. The system determines location of the strike zone and the ball in real space. The locations of the strike zone and the ball are depicted in the video. Based on knowing the locations of the strike zone and the ball, the system can determines whether the pitch was a strike or a ball.

51 Claims, 6 Drawing Sheets without K Zone graphic     with K Zone graphic

VIRTUAL STRIKE ZONE

This application claims the benefit of U.S. Provisional Application No. 60/346,990, "Virtual Strike Zone," filed on Jan. 9, 2002, which is incorporated herein by reference.

BACKGROUND OF THE INVENTION

1. Field of the Invention

The present invention is directed to the depiction of a strike zone (or other) to an image.

2. Description of the Related Art

When watching a baseball game on television, it is not clear to the viewer where the exact boundaries of the strike zone are. Furthermore, it is not clear whether the umpire correctly determined whether the pitch was a strike or a ball.

SUMMARY OF THE INVENTION

The present invention, roughly described, pertains to a system that adds a graphical image of the strike zone to a video or other image of a baseball game. The system determines location of the strike zone and the ball in real space. The locations of the strike zone and the ball are depicted in the video. Based on knowing the locations of the strike zone and the ball, the system can determines whether the pitch was a strike or a ball.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION

Figure 1:
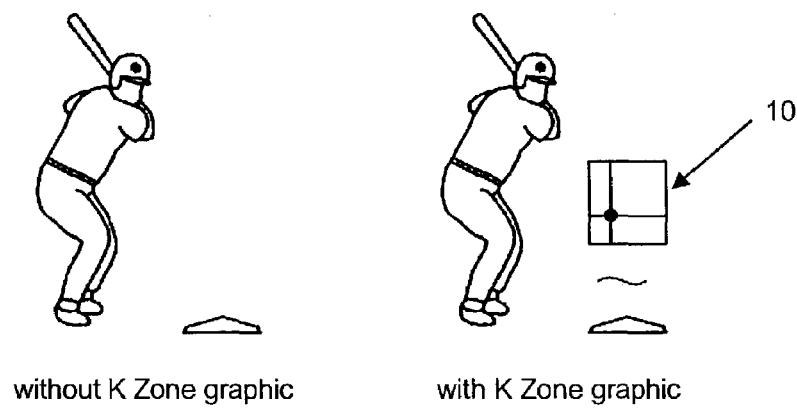
FIG. 1 illustrates the graphic effect added by one embodiment of the present invention.

One embodiment of the system adds a graphical image of the strike zone to a video of a baseball game. The system can be used with live video, still images or replays. In one embodiment, the virtual strike zone graphic appears as a three dimensional box. FIG. 1 illustrates the graphic effect added by one embodiment of the present invention.

As can be seen from FIG. 1, the left image shows a batter at home plate. The image on the right shows a batter at home plate with the strike zone graphic 10 added by the system. In some (but not all) instances, the graphic will include cross hairs and a solid circle to indicate the location where the baseball intersected the front plane of the strike zone. As different cameras are used and/or panned/tilted, the three dimensional strike zone will be seen from different perspectives. The system, however, takes no measures to account for occlusions.

One embodiment of the present invention includes two subsystems: a tracking system and an enhancement system. The tracking system is used to track the three dimensional positions of the ball and the strike zone. The enhancement system is used to add the desired graphical effect to the video of the baseball game.

Figure 2:
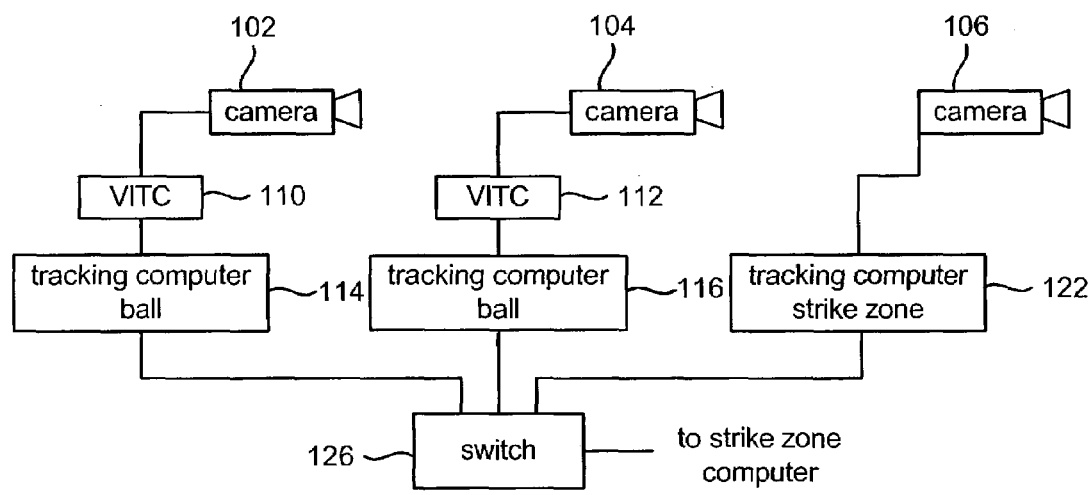
FIG. 2 is a block diagram of the components of one embodiment of the tracking system.

FIG. 2 is a block diagram of the components of the tracking system. The tracking system includes two sensor cameras 102 and 104 for tracking a baseball and one sensor camera 106 for tracking the height of the strike zone. These cameras are rigidly mounted and, thus, cannot pan, tilt or zoom. The first sensor camera 102 is mounted in the stadium, above the field, and approximately perpendicular to the line of the pitch ("first base sensor"). The first base sensor has a field of view that includes the last half of the pitch. The second sensor camera 104 is near and behind home plate ("high home sensor"). The third sensor camera 106, used for tracking the height of the strike zone, is positioned to have a good view of home plate. Usually, this camera sensor will be located in center field ("centerfield sensor"). The sensor cameras do not provide video for broadcast, they are only used for tracking the strike zone and the ball.

The sensor cameras for tracking the ball communicate video to Vertical Interval Time Code (VITC) inserters 110 and 112. The video from each VITC inserter is sent to a respective tracking computer 114 and 116. The tracking computers 114 and 116 are connected to each other and to the Strike Zone computer 122 (described below) via a switch 126 (using Ethernet). The tracking computer connected to the camera sensor for tracking the strike zone has a graphical user interface (GUI) which is used to set the height of the strike zone.

Figure 3:
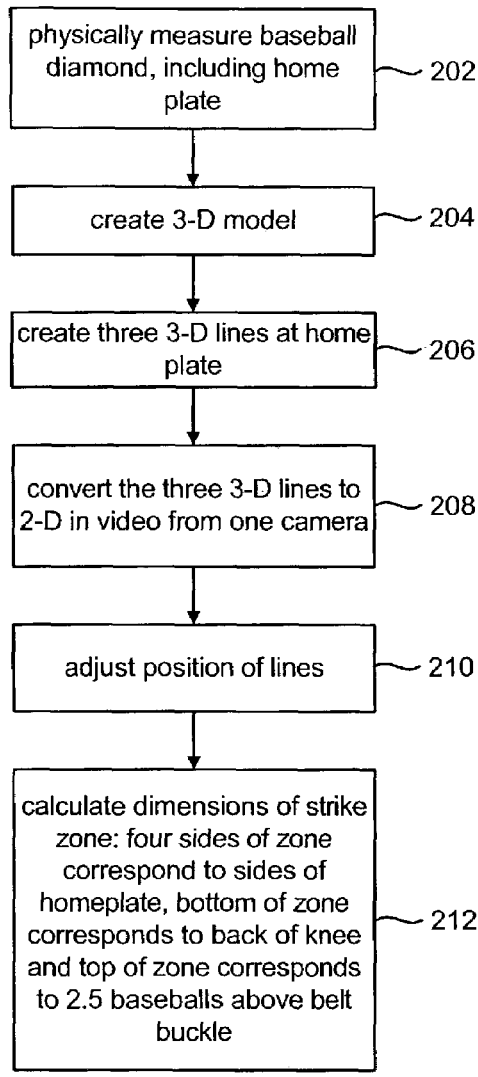
FIG. 3 is a flowchart describing one embodiment of the process for setting the boundaries of the strike zone.

FIG. 3 is a flowchart describing the process for setting the boundaries of the strike zone. Prior to the game, the physical dimensions of the baseball diamond (including home plate) are measured (step 202). A three dimensional coordinate system is defined with the origin of the coordinate system at the corner of home plate. This three dimensional coordinate system is used for tracking the baseball, the strike zone and various edges (discussed below). The measurements for the diamond are made in this coordinate system.

The system creates three parallel lines in the three dimensional coordinate system (step 206). Each of the three lines is at a different height. The three dimensional coordinates of the three lines are converted to two dimensional positions in the video from the center field sensor using a transformation matrix (see step 204) based on the orientation and location of the center field sensor (step 208). The converted lines are then projected on the video from the center field sensor. Sliders on a GUI from the tracking computer can be moved to adjust the positions of the lines (step 210). There is one slider for each line. The Operator moves the sliders so that the bottom line is at the bottom of the batter's feet, the middle line passes through the hollow of the back of the batter's knee and the top line passes through the batter's belt buckle. As the batter moves, the operator can move the three sliders. An operator can also move a joystick. This joystick will adjust the top line, the belt buckle line. When the belt buckle line moves in response to the joystick, the knee line also moves to maintain the ratio of spacing between the lines. During most games, the operator uses the joy stick. The system can also operate with separate joysticks for the belt and knee line. When a line is moved, the tracking computer changes the three dimensional location of the appropriate line(s). Once a three dimensional position of a line is changed, the new three dimensional position is transformed to a new two dimensional position in the video and the line is moved in the video accordingly.

The system calculates the dimensions of the strike zone as follows (step 212). The four sides of the three dimensional box representing the strike zone are defined by the dimensions of home plate. The bottom of the strike zone is set to at the back of the hollow of the batter's knee. This corresponds to the middle line of the three lines. The top of the strike zone corresponds to a position 2½ diameters of a baseball above the batter's belt buckle (the top line).

Figure 4:
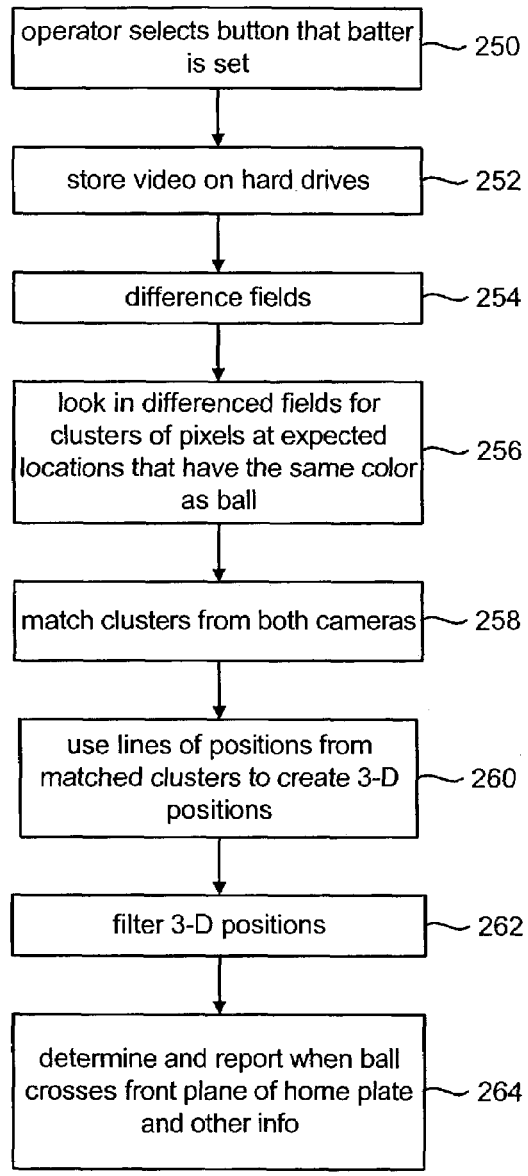
FIG. 4 is a flow chart that explains one embodiment of the process of tracking a baseball.

The tracking system of FIG. 2 is also used to track the three dimensional position of the baseball. FIG. 4 is a flow chart that explains the process of tracking a baseball. The operator of the GUI for the master tracking computer will push a button on the GUI or keyboard to indicate that the batter is set (step 250). A batter is set when the batter's front foot is planted. The set button indicates to the system to stop accepting data about the height of the strike zone. It is also used as a trigger the system to save the last second of video and the next second of video to the hard disk (step 252). In step 254, the fields of stored video are then differenced against adjoining-in-time fields (even fields are differenced against previous even fields and odd fields are differenced against previous odd fields).

Each tracking computer looks at the differenced fields from its associated sensor camera (step 256). Prior to the game, an operator will indicate where in the video the ball is expected to be during a pitch. The tracking computer will look in those areas for a cluster of pixels that are in the YUV color space of the ball's color. Pre-set variables define the minimum and maximum sizes of a cluster in numbers of pixels, as well as acceptable shapes for the cluster's bounding box. A number of clusters are thus identified in each field. After a few consecutive fields are processed, the system selects at most one cluster based on relative position: the cluster must be identifiable in subsequent fields, with different positions obtained by a regular translation. The translation parameters (direction, amplitude) are pre-set variables. All such variables can be interactively modified during the operation of the system.

If clusters were selected for each of the cameras, they are matched (step 258). For each pair of matched clusters, a three dimensional position is determined by creating symbolic lines of position from each camera to the potential ball location based on the cluster (step 260). An adjoining line is determined at the closest point of intersection between the two lines of position. The three dimensional position determined is based on the x coordinate of the position where the determined adjoining line crosses the line of position from the high home sensor. The y and z coordinates are based on the y and z coordinates of the position where the determined adjoining line crosses the line of position from the first base sensor. The resulting set of three dimensional locations are operated on by a Kalman filter, which filters the data and creates a set of three dimensional locations representing the path of the ball (step 262).

By knowing the three dimensional positions of the ball and the three dimensional positions of the strike zone, the system determines when and where the ball intersected (or would have intersected) the plane at the front surface of the strike zone (step 264). The tracking computer reports to the Strike Zone computer a time code indicating when the ball crossed the plane, the three dimensional location where it crossed the plane, whether it was a strike or a ball, and a three dimensional location for where the ball would have hit the catcher's glove. The height information for the strike zone is also communicated at various times during the game. The three dimensional location for where the ball would have hit the catcher's glove is estimated by determining the trajectory of the ball and predicting where it will be one frame after it crosses the front surface of the strike zone.

The enhancement subsystem of the system includes four broadcast cameras, associated hardware, and a production center. The four broadcast cameras are located at a high location on the stadium behind home plate (high high home), a low position near the first baseline (low first), a low position near the third baseline (low third) and in center field (center field). The positions vary based on the production requirements and/or the stadium. The high high home camera and the center field camera do not pan, tilt or zoom. The low first and low third cameras can pan, tilt and zoom.

Figure 5:
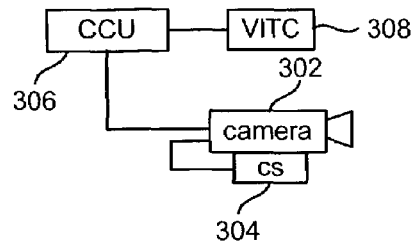
FIG. 5 is a block diagram of one embodiment of the equipment for the low first and low third cameras.

FIG. 5 is a block diagram of the equipment for the low first and low third cameras. The low first and low third cameras 302 are each associated with a set of camera sensors (CS) 304. These camera sensors include an optical shaft encoder to measure pan, an optical shaft encoder to measure tilt, a set of inclinometers that measure attitude of the camera head and electronics for sensing the positions of the camera's zoom lens and 2× extender. The information from the camera sensors is encoded on an audio signal and sent down one of the microphone channels from the camera to a camera control unit (CCU) 306. The CCU transmits the video to a VITC inserter 308 which adds time code. The output of the VITC inserter 308 is sent to a production truck and to one of the edge tracking computers (discussed below). The audio signal from CCU 306 is sent to an audio demodulator (below).

Figure 6:
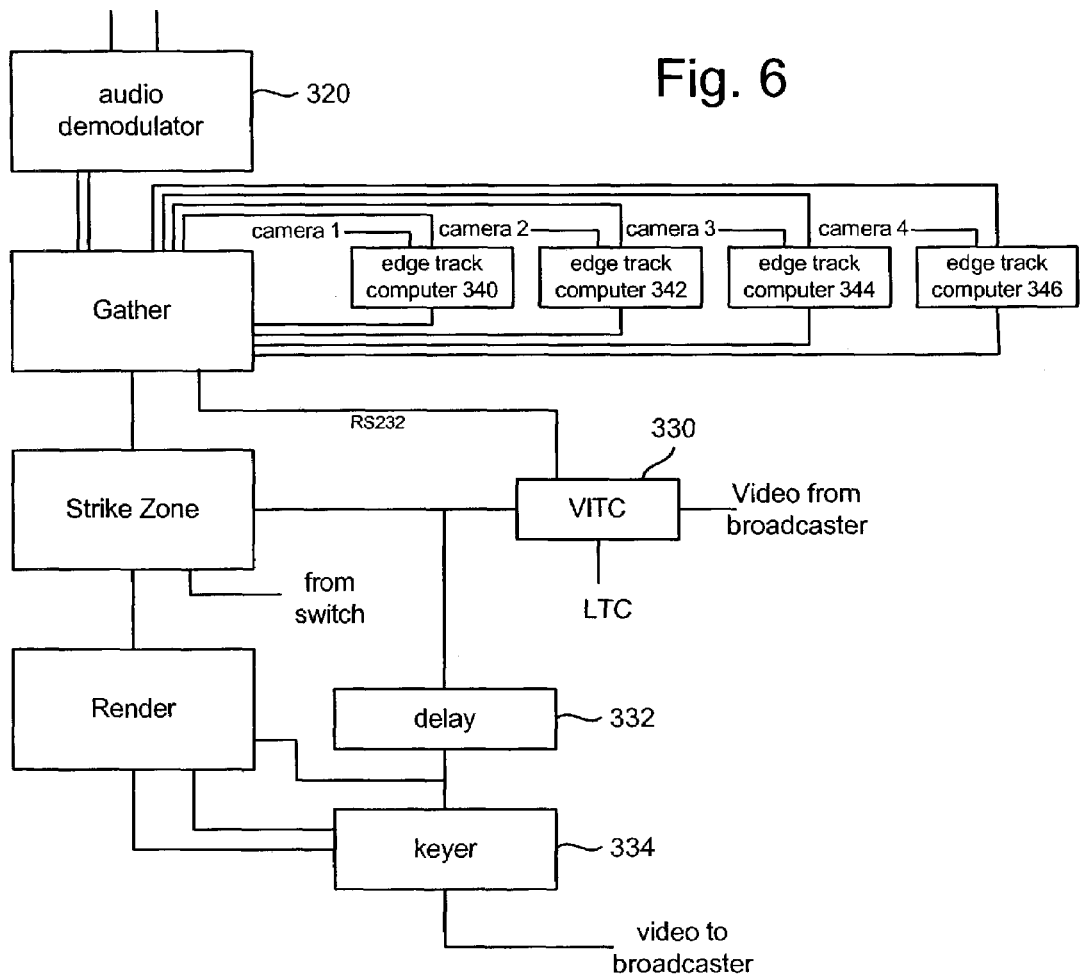
FIG. 6 is a block diagram of one embodiment of the components at the production center.

FIG. 6 is a block diagram of the components at the production center, which is housed in a truck at the stadium. The audio signals from the appropriate cameras are received by an audio demodulator 320 which extracts the camera sensor data and provides that camera sensor data to a personal computer, labeled as Gather. The camera sensor data is packaged and forwarded to an O2 computer (from Silicon Graphics), labeled as the Strike Zone computer.

The video that the broadcaster chooses to enhance is first sent to a VITC inserter 330, which is synced with the other VITC inserters mentioned above. The VITC inserters associated with the broadcast cameras add a camera ID and a time stamp to lines 21 and 22 of the vertical blanking interval. VITC inserter 330 adds a time stamp to lines 16-18. The video from the VITC inserter 330 is sent to the Strike Zone computer and video delay 332. Time code data is sent from the VITC to the Gather computer via an RS232 line. Video from the video delay is transmitted to keyer 334 and the Render computer.

The Strike Zone computer receives the camera sensor data from the Gather computer, receives the video from VITC inserter 330, and receives the ball positions and strike zone positions from the master tracking computer. The Strike Zone computer determines if and where to add the graphics to the video. This information is sent to the Render computer, which renders the graphical enhancement and sends that information to keyer 34. Keyer 34 adds the virtual strike zone, cross hairs and solid circle graphics from the Redner computer to the delayed video. From keyer 34, the video is communicated back to the broadcaster.

Figure 7:
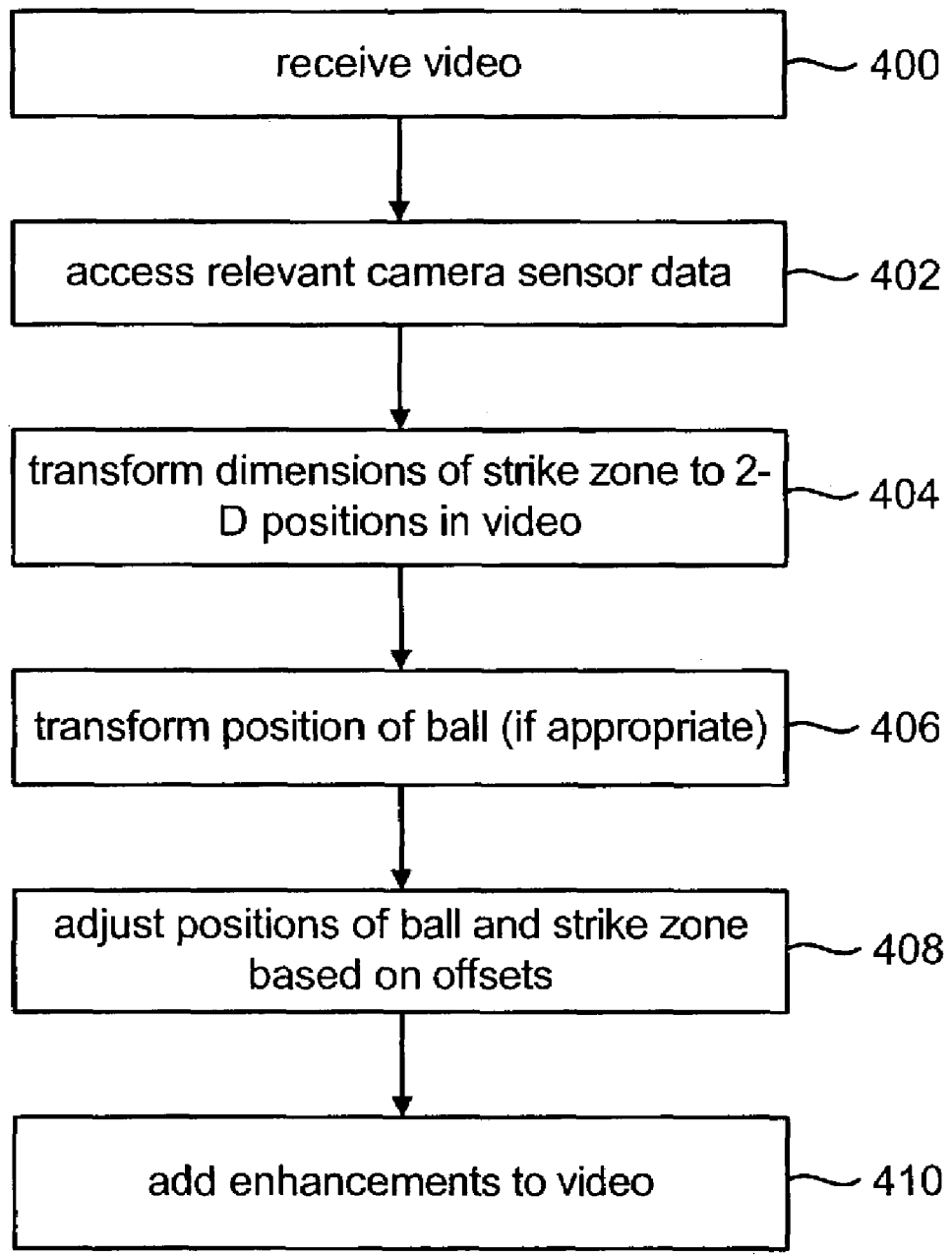
FIG. 7 depicts a flowchart which describes one embodiment of the process performed by the enhancement system of FIG. 6.

FIG. 7 depicts a flowchart which describes the process performed by the enhancement system of FIG. 6. As discussed above, the Strike Zone computer receives video from the broadcaster (step 400). That video includes a camera identifier in the vertical blanking interval. Based on that camera identifier, the Strike Zone computer accesses the appropriate camera sensor data (step 402) and transforms the locations of the strike zone (step 404) and ball (step 406) (if the ball is to be depicted in the video) to two dimensional positions in the video. The Strike Zone computer uses a transformation matrix based on the camera sensor data to perform the transformation. The positions of the strike zone and the ball are then adjusted based on offsets (step 408). These offsets include an X offset and a Y offset, which are in units of pixels. If the X offset is three pixels, then each of the positions determined for the strike zone and the ball are shifted in the X direction by three pixels. The offsets are a measure of the error in the camera sensor data. The determination of the offsets will be discussed below. After the positions of the strike zone and the ball are determined in the video, the virtual images of the strike zone, ball position and/or crosshairs are rendered by the Render computer. These images are then added to the video using the keyer (step 410).

The strike zone is added to every field of video that passes through the keyer. The crosshairs, however, are not always added to the video. If the pitch is a strike, a seven frame animation is created. In the first frame of the animation, the cross hairs are added with the center of the cross hairs being at the center of the strike zone. In the seventh frame of the animation, the cross hairs are centered at the position that the ball intersects the front surface of the strike zone. The intervening frames show the center of the cross hairs at intervening locations moving from the center of the strike zone to the position of the ball when it intersects the strike zone. Note that the seventh frame depicts the game at the time the ball intersects the front surface of the strike zone.

If the pitch was a ball, the cross hairs are not added to the video. Instead, a circle is added to the video, indicating the position of the ball when it intersected the plane corresponding to the front surface of the strike zone. If a ball trail is used (if the camera angle is a side view and the pitch was a strike) then a trail animates from the front plane of the strike zone to the estimated position of the ball where it contacted the catcher's glove. This ball trail graphic does not use data from any positions prior to the ball intersecting the strike zone.

As discussed above, the transformed positions of the ball and strike zone are adjusted based on an X offset and a Y offset. These offsets are determined by the four edge track computers depicted in FIG. F. There is one edge track computer for each broadcast camera. Each edge track computer receives camera sensor data from the Gather computer and video for its associated broadcast camera. The edge track computer determines an X offset and a Y offset for the associated broadcast camera based on edges in the video. These offsets are reported to the Gather computer. The Gather computer transmits the offsets to the Strike Zone computer, which uses the appropriate offsets based on which camera supplied the video chosen by the broadcaster.

Prior to the game, the operator of the system selects a set of edges for use by the edge computers. These edges are frequently updated during the game. The edges selected should be easy to see, and not at the location of or near the perimeter of where the strike zone will be inserted. Each selection of an edge identifies one pixel as the edge. An edge is a color transition in the video image. When an edge is selected, the operator indicates whether the edge is a horizontal edge or a vertical edge. An edge is a horizontal edge if the transition is made between consecutive pixels in a vertical direction, thus (possibly) creating a horizontal line. An edge is a vertical edge if the transition is made between consecutive pixels in a horizontal direction, thus (possibly) creating a vertical line. It is recommended that at least five vertical edges and five horizontal edges are selected, but more is better (e.g. twenty five vertical edges and twenty five horizontal edges). The edges are selected using a mouse. The position of the edge pixels are transformed to locations in three dimensional space. In addition to transforming the edge pixel, the system stores the color values (e.g. Y, Cr, Cb) for the edge pixel, for seven pixels to one side of the edge pixel, and for eight pixels to the other side of the edge pixel. For a horizontal edge, the sixteen consecutive pixels are on a vertical line. For a vertical edge, the sixteen consecutive pixels are on a horizontal line.

Figure 8:
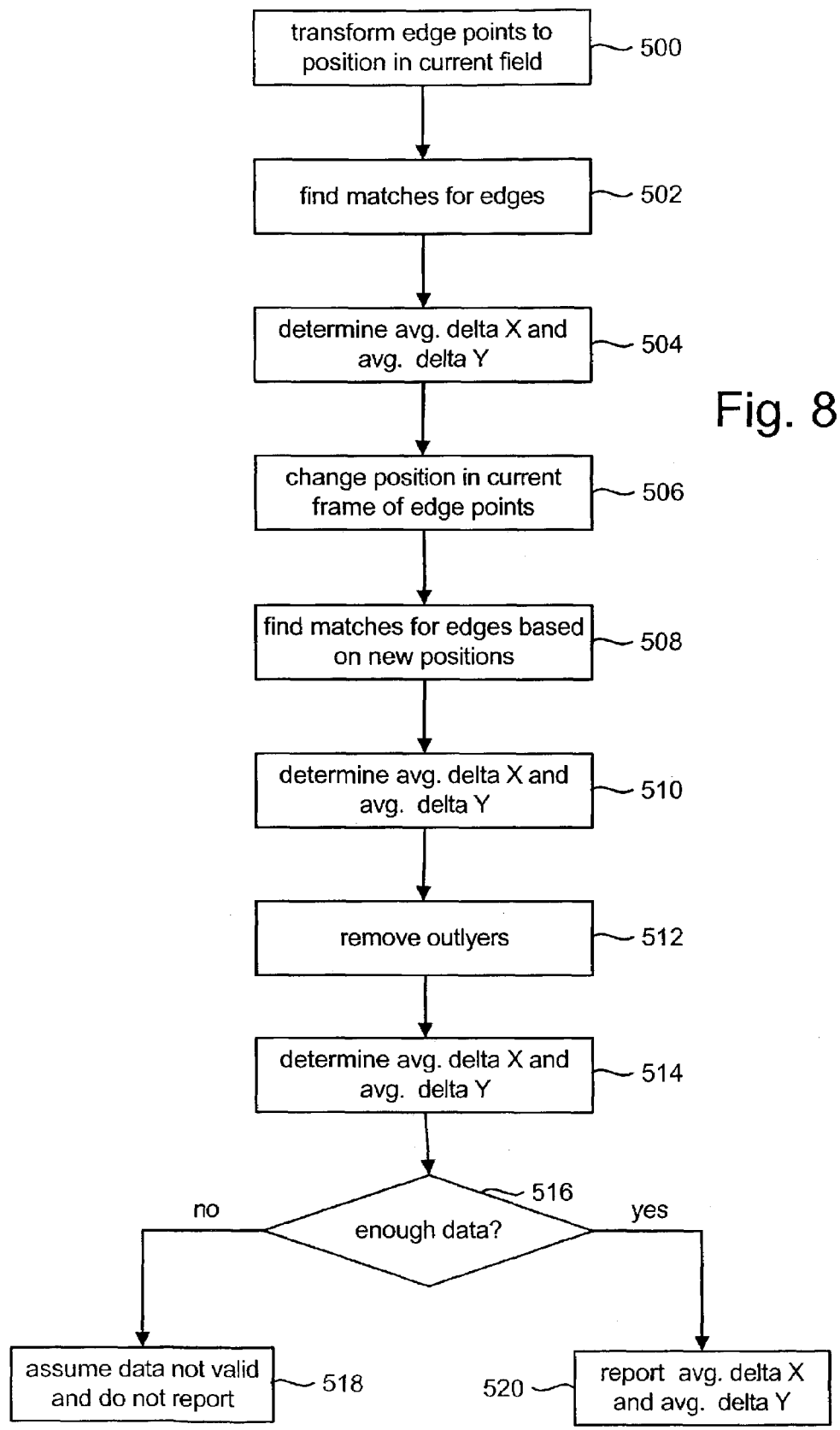
FIG. 8 is a flow chart describing one embodiment of the process of determining the offsets based on the edges.

FIG. 8 is a flow chart describing the process of determining the offsets based on the edges. In step 500 of FIG. 8, the three dimensional position of the edge points are transformed to the current field of the video from the broadcaster. The appropriate edge tracking computer attempts to match the transformed edges with the same edges in the current field (step 502). In an ideal world, the camera sensor data is error free, camera lens model is error free, the camera platform is perfectly rigid and the transformed edge positions match the actual positions of the edges in the current field. However, in some cases it is possible that the transformed edge positions may differ from the actual positions of the edges in the current field by a small number of pixels. The offset process attempts to determine the amount these positions differ. In cases where the actual edges are at a different position than the transformed edges, the system determines a first average delta X and a first average delta Y (step 504). The average delta X is the average difference between the transformed X positions and the actual X positions. The average delta Y is the average difference between the transformed Y positions and the actual Y positions.

Following the initial determination of average delta X and average delta Y. each of the transformed edge positions are updated by the average delta X and average delta Y values (step 506). The system then attempts to match the transformed edges having positions updated by the average delta X and average delta Y values with the actual edges in the current field (step 508). A new set of average delta X and an average delta Y values are computed (step 510). "Outlier" edges are then removed (step 512). An "outlier" edge is an edge having an associated delta X that is more than three pixels different than the latest average delta X or an edge having an associated delta Y that is more than three pixels different than the latest average delta Y. After the "outlier" edges are removed, average delta X and average delta Y are recalculated (step 514). The system then determines whether there is enough data being used to calculate the average delta X and the average delta Y (step 516). In the current implementation, there is enough data if the average delta X is based on five or more edge matches and the average delta Y is based on five or more edge matches. If there is not enough data, then the offsets (one or both) are not reported by the process of FIG. 8 (step 518). The rejection of the X offset due to insufficient data is independent from the rejection of the Y offset due to insufficient data. If there is sufficient data, then the latest average delta X is reported as the X offset and/or the latest average delta Y is reported as the Y offset (step 520).

Figure 9:
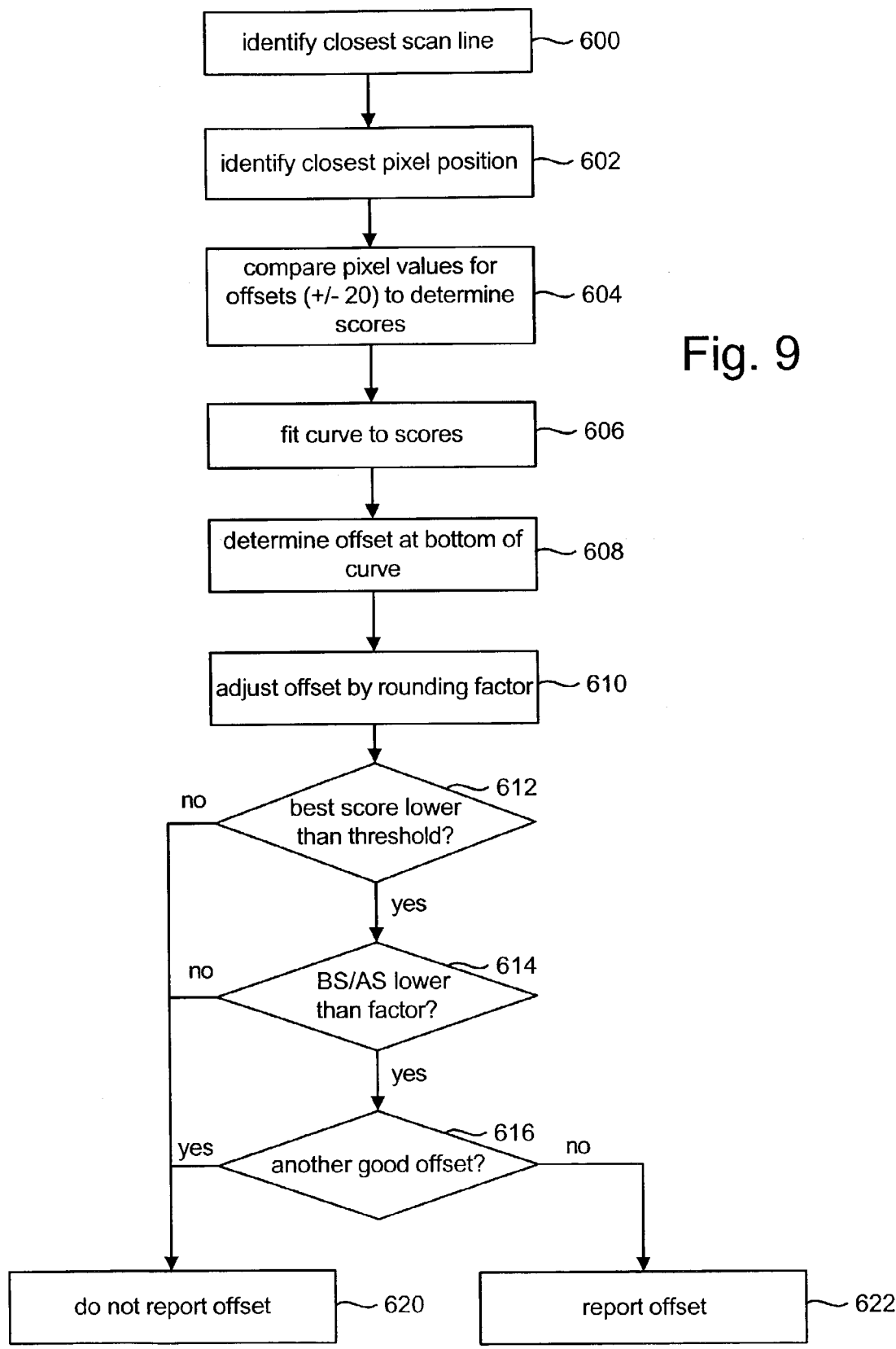
FIG. 9 is a flow chart describing one embodiment of the process of finding a match for one edge that was transformed to the corresponding actual edge in the current field of video.

FIG. 9 is a flow chart describing the process of finding a match for one edge that was transformed to the corresponding actual edge in the current field of video. The process of FIG. 9 is performed for each transformed edge prior to determining average delta X and delta Y. The system starts by finding the closest scan line to the transformed edge (step 600). Each edge had a three dimensional position that is transformed into X and Y coordinates on the current field. The Y coordinate represents a scan line in the video field. When the three dimensional position on the virtual surface is transformed, the Y coordinate may not necessarily be an integer. Therefore, the transformed Y coordinate is rounded to the nearest integer in order to identify the closest scan line. The system also identifies the closest pixel position (step 602). That is, the transformed X coordinate pertains to a pixel position on a scan line. If the transformed X coordinate is not an integer, it is rounded to the nearest integer in order to identify a pixel.

The color value for the edge pixel and the fifteen pixels on the two sides of the edge pixel (seven on one side, eight on the other side) are compared to the color values of sixteen consecutive pixels in the field. This comparison is performed forty one times. The first comparison is made by lining up the edge pixel with the pixel in the current field having the same pixel position and scan line as previously determined. The other fifteen pixels for the edge are compared against corresponding pixels in the current field. For example, the center pixel may have coordinates (50,100), and the other fifteen pixels may have coordinates of (42, 100), (43, 100), (44, 100), (45, 100), (46, 100), (47, 100), (48, 100), (49, 100), (51, 100), (52, 100), (53, 100), (54, 100), (55, 100), (56, 100), and (57, 100). These sixteen edge pixels are compared to the sixteen pixels in the current field having the same coordinates. The comparison includes determining the difference between the Y values, Cr values or Cb values. The comparison determines forty eight difference values, which are then added together to determine a score for the entire comparison.

This comparison process (step 604) is done forty more times, generating forty more scores. However, for each additional comparison the sixteen edge pixels are compared against a different set of pixels from the current field by offsetting the coordinates by up to +/−20. If the edge is a horizontal edge, then the X coordinate is changed for each pixel at each comparison. For example, the center edge having coordinates (50, 100) will first be compared against the pixel from the current field having coordinates of (50, 100). Subsequent comparison for that edge pixel will look at pixels in the current field with coordinates of (30, 100), (31, 100), (32, 100), . . . (48, 100), (49, 100), (51, 100), (52, 100), (53, 100), . . . , (70, 100). In the end, there are forty one scores, each score associated with an offset up to +/−20. The above example is explained in regard to a horizontal edge. For a vertical edge, a vertical set of pixels is compared to sets of vertical pixels with the scan line being changed +/−20 scan lines.

Symbolically, the scores are plotted on a graph with score as the vertical axis and offset as the horizontal axis. A parabola is fitted to the data (step 606). The system determines the offset value at the bottom of the parabola (step 608) and rounds that offset value to the nearest integer (step 610). The three diamonds depicted in the flow chart of FIG. 9 include three tests for determining whether the rounded offset is reliable data. First, in step 612, the system determines whether the lowest score of all forty one scores is lower than a threshold (e.g. 500). If not, the rounded offset is not reported (step 620). Second, in step 614, the system determines whether the best score divided by the average score is lower than a test factor (e.g. 0.5). If not, the rounded offset is not reported (step 620). Third, in step 616, the system determines whether there is another low offset. That is, is there another valley in the data/curve. If so, the rounded offset is not reported (step 620). Otherwise, the rounded offset is reported (step 622).

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of providing strike zone information, comprising the steps of:
    determining a set of one or more locations of a ball from a first set of video images;
    determining a three dimensional volume representing a strike zone;
    determining whether one of said one or more locations of said ball intersects the three dimensional volume representing the strike zone;
    converting the three dimensional volume and one or more locations of a ball to two-dimensional locations within a second video image using data in the second video image; and
    indicating whether one of said set of one or more locations of said ball intersects the three dimensional volume representing the strike zone,
    wherein said step of determining a set of one or more locations of a ball includes the steps of:
        receiving the first set of video images that depict said ball,
        searching for data in a restricted area of said video images, said restricted area being an area where said ball is expected to be during a pitch, and
        using said data to automatically determine said one or more locations.

2. A method according to claim 1, further comprising the steps of:
    determining a location of said strike zone;
    determining a first position in a video, said first position corresponding to said location of said strike zone;
    adding an image for said strike zone to said video at said first position.

3. A method according to claim 1, wherein:
    said step of indicating includes displaying crosshairs, said crosshairs have a center, said center represents a position where said ball intersects a front surface of said three dimensional volume representing the strike zone.

4. A method according to claim 1, wherein:
said step of indicating includes displaying a location of said strike zone and a location of said ball.

5. A method according to claim 1, wherein:
said step of indicating includes adding an image of said strike zone to video of a baseball game.

6. A method according to claim 1, wherein said step of converting includes:
transforming the three dimensional volume and one or more locations of a ball to two-dimensional locations within the second video; and
adjusting the positions of the ball and three dimensional volume based on offsets derived from transformed edges based on camera sensor data and actual edges in the second video image.

7. A method according to claim 2, further comprising the steps of:
determining a second position in said video, said second position corresponding to one of said set of one or more locations of said ball;
adding an image for said ball to said video based on said second position; and
determining whether said ball intersects said strike zone.

8. A method according to claim 2, wherein:
said video is from a first camera;
said first camera can change orientation;
said first camera includes one or more camera sensors for measuring orientation information of said first camera; and
said step of determining a first position uses said orientation information.

9. A method according to claim 8, wherein:
said one or more camera sensors includes a shaft encoder to measure pan and a shaft encoder to measure tilt.

10. A method according to claim 8, wherein:
said step of determining a first position includes correcting for error in said orientation information.

11. A method according to claim 8, wherein:
said step of determining a first position includes correcting for error in said orientation information by offsetting said first position based on positions of predefined edges in said video.

12. A method according to claim 2, wherein:
said video is from a first camera of a set of multiple camera capturing a baseball game; and
said step of determining a first position includes receiving an indication of said first camera, accessing transformation data specific to said first camera from sets of transformation data specific to each of said cameras and transforming said location of said strike zone to a two dimensional position in said video.

13. A method according to claim 2, wherein:
said step of determining a first position includes correcting for error in said first position by offsetting said first position.

14. A method according to claim 2, wherein:
said step of determining a first position includes correcting for error in said first position by offsetting said first position based on positions of predefined edges in said video.

15. A method according to claim 2, wherein:
said video is from a first camera;
said step of determining a location of said strike zone is performed using a fourth camera; and
said step of determining a set of one or more locations of a ball is performed using a third camera.

16. A method according to claim 2, wherein:
said step of determining a location of said strike zone includes receiving positions of lines in an image of a batter, said lines corresponding to positions of said batter's body.

17. A method according to claim 16, wherein:
said lines include a first line, a second line and a third line;
a first line is positioned at said batter's feet;
a second line is positioned at said batter's knee; and
a third line is positioned at said batter's belt area.

18. A method according to claim 16, wherein:
said lines move in response to an input device such that a ratio of space between said lines remains constant.

19. A method according to claim 2, wherein:
said step of determining a location of said strike zone includes using one or more positions indicated on said batter in an image of said batter to determine height of said strike zone.

20. A method according to claim 19, wherein:
said video is from a first camera of a set of multiple camera capturing a baseball game; and
said step of determining a first position includes receiving an indication of said first camera, accessing transformation data specific to said first camera from sets of transformation data specific to each of said cameras and transforming said location of said strike zone to a two dimensional position in said video.

21. A method of providing strike zone information, comprising the steps of:
determining one or more locations of a ball; and
indicating within a video image whether one of said one or more locations of said ball intersects a strike zone;
wherein said step of determining includes the steps of:
receiving a set of video images that depict said ball, said video images include multiple data,
identifying which data of said multiple data corresponds to said ball using a series of filters, each filter potentially removes data from consideration as a candidate for said ball, said series of filters including a filter having a criteria that is independent of other images, and
using said data that corresponds to said ball to automatically determine said one or more locations.

22. A method according to claim 21, wherein:
said series of filters includes searching for data in a restricted area of said video images, searching for pixels in an appropriate color space, searching for minimum size clusters, searching for maximum size clusters, and searching for clusters having predefined shapes for a bounding box.

23. A method according to claim 21, wherein said step of identifying which data of said multiple data corresponds to said ball includes the steps of:
searching for clusters of data that are identifiable in subsequent fields of video; and
identifying matching clusters from two cameras.

24. A method according to claim 23, wherein said step of using said data includes the steps of:
using lines of position from matching clusters to identify three dimensional locations; and
filtering said three dimensional locations.

25. A method according to claim 21, further comprising the steps of:
    determining a location of said strike zone;
    determining a first position in a video, said first position corresponding to said location of said strike zone, wherein said step of determining the first position includes:
        converting the three dimensional volume of said strike zone to two-dimensional locations within the video using data in video; and
    adding an image for said strike zone to said video at said first position.

26. A method according to claim 21, further comprising the steps of:
    determining a second position in said video, said second position corresponding to one of said set of one or more locations of said ball;
    adding an image for said ball to said video based on said second position; and
    determining whether said ball intersects said strike zone.

27. A method according to claim 25, wherein:
    said video is from a first camera;
    said first camera can change orientation;
    said first camera includes one or more camera sensors for measuring orientation information of said first camera; and
    said step of determining a first position uses said orientation information.

28. A method according to claim 27, wherein:
    said step of determining a first position includes correcting for error in said orientation information be offsetting said first position based on positions of predefined edges in said video.

29. A method according to claim 25, wherein:
    said video is from a first camera of a set of multiple camera capturing a baseball game; and
    said step of determining a first position includes receiving an indication of said first camera, accessing transformation data specific to said first camera from sets of transformation data specific to each of said cameras and transforming said location of said strike zone to a two dimensional position in said video.

30. A method according to claim 25, wherein:
    said step of determining a location of a strike zone includes using one or more positions indicated on said batter in an image of said batter to determine height of said strike zone.

31. A method of providing strike zone information, comprising the steps of:
    determining a location of a strike zone for a first batter by receiving an indication of one or more positions on said first batter in an image of said first batter and using said indicated positions to automatically calculate height and a three dimensional volume of said strike zone;
    determining a first position in a video, said first position corresponding to said location of said strike zone; and
    adding an image for said strike zone to said video at said first position, wherein said step of determining the first position includes:
        converting the three dimensional volume of said strike zone to two-dimensional locations within the video using data in video.

32. A method according to claim 31, wherein:
    said video is from a first camera;
    said first camera can change orientation;
    said first camera includes one or more camera sensors for measuring orientation information of said first camera; and
    said step of determining a first position uses said orientation information.

33. A method according to claim 32, wherein:
    said step of determining a first position includes correcting for error in said orientation information be offsetting said first position based on positions of predefined edges in said video.

34. A method according to claim 31, wherein:
    said video is from a first camera of a set of multiple camera capturing a baseball game; and
    said step of determining a first position includes receiving an indication of said first camera, accessing transformation data specific to said first camera from sets of transformation data specific to each of said cameras and transforming said location of said strike zone to a two dimensional position in said video.

35. A method according to claim 31, wherein:
    said step of receiving an indication includes receiving positions of lines in a video of a batter, said lines corresponding to positions of said batter's body.

36. A method according to claim 35, wherein:
    said lines include a first line, a second line and a third line;
    a first line is positioned at said batter's feet;
    a second line is positioned at said batter's knee; and
    a third line is positioned at said batter's belt area.

37. A method according to claim 35, wherein:
    two or more of said lines move in response to an input device such a ratio of space between said lines remains constant.

38. An apparatus for providing strike zone information, comprising:
    a set of image sensors arranged to sense data about a ball and a strike zone; and
    one or more processors in communication with said image sensors, said one or more processors use data from said sensors to determine one or more locations of said ball and determine a location of said strike zone for a batter by using one or more positions indicated on said batter in an image of said batter to determine height of said strike zone, said one or more processors determine a first position in a video corresponding to said location of said strike zone and add a first image for said strike zone to said video at said first position, said one or more processors determine a second position in said video corresponding to one of said set of one or more locations of said ball and add a second image based on said second position, said one or more processors converting the height of said strike zone and one or more locations of said ball to two-dimensional locations within the video using data in the video.

39. An apparatus according to claim 38, wherein:
    said one or more processors determine whether said ball intersects said strike zone and report whether said ball intersects said strike zone.

40. An apparatus according to claim 38, wherein:
    said adding of a first image and adding of a second image includes adding graphics to said video to depict said strike zone and where said ball intersected said strike zone.

41. An apparatus according to claim 38, wherein:
said image sensors include a first camera used to determine said location of said strike zone and two additional cameras used to determined said one or more locations of said ball; and
said video is captured by a fourth camera.

42. An apparatus according to claim 38, wherein:
said video is from a first camera;
said first camera can change orientation;
said first camera includes one or more camera sensors for measuring orientation information of said first camera; and
said step of determining a first position uses said orientation information.

43. An apparatus according to claim 42, wherein:
said determining of said first position includes correcting for error in said orientation information be offsetting said first position based on positions of predefined edges in said video.

44. An apparatus according to claim 38, wherein:
said video is from a first camera of a set of multiple camera capturing a baseball game; and
said determining of said first position includes receiving an indication of said first camera, accessing transformation data specific to said first camera from sets of transformation data specific to each of said cameras and transforming said location of said strike zone to a two dimensional position in said video.

45. An apparatus according to claim 38, wherein:
said determining one or more locations of said ball includes the steps of:
receiving a set of video images that depict said ball, said video images include multiple data,
identifying which data of said multiple data corresponds to said ball using a series of filters, each filter potentially removes data from consideration as a candidate for said ball, and
using said data that to corresponds to said ball to automatically determine said one or more locations.

46. An apparatus for providing strike zone information, comprising:
a set of image sensors arranged to sense data about a ball and a strike zone;
a first set of one or more processors in communication with said image sensors, said first set of one or more processors use data from said sensors to determine one or more locations of said ball and determine a set of three dimensional coordinates representing a location of said strike zone;
a second processor in communication with said first set of one or more processors, said second processor receives an indication of a first camera of a set of cameras, accesses transformation data specific to said first camera from sets of transformation data specific to each of said cameras and transforms said one or more locations of said ball and said three dimensional coordinates representing said location of said strike zone to two dimensional positions in a video from said first camera;
a third processor in communication with said second processor, said third processor prepares an image of said strike zone and an image of said ball; and
a video modification unit in communication with said third processor and able to receive video from said cameras, said video modification unit receives said image of said strike zone and said image of said ball, said video modification unit adds said image of said strike zone and said image of said ball to said video from said first camera by converting the three dimensional coordinates of said strike zone and one or more locations of said ball to two-dimensional locations within said video using data in said video.

47. An apparatus according to claim 46, wherein:
said image sensors include a first camera used to determine said location of said strike zone and two additional cameras used to determined said one or more locations of said ball; and
said video is captured by a fourth camera.

48. An apparatus according to claim 46, wherein:
said determining of one or more locations of said ball includes the steps of:
receiving a set of video images that depict said ball, said video images include multiple data,
identifying which data of said multiple data corresponds to said ball using a series of filters, each filter potentially removes data from consideration as a candidate for said ball, and
using said data that to corresponds to said ball to determine said one or more locations.

49. An apparatus according to claim 46, wherein:
said determining of one or more locations of said ball includes the steps of:
receiving a set of video images that depict said ball,
searching for data in a restricted area of said video images, said restricted area being an area where said ball is expected to be during a pitch, and
using said data to determine said one or more locations.

50. An apparatus according to claim 46, wherein:
said video modification unit is a keyer.

51. An apparatus according to claim 46, further comprising:
a video delay device in communication with said video modification unit, said video delay device receives said video from said first camera, delays said video from said first camera and send said delayed video from said first camera to said video modification unit.

* * * * *